J. O. MONTIGNANI.
SECURING RAILWAY BARS.
No. 41,633. Patented Feb. 16, 1864.
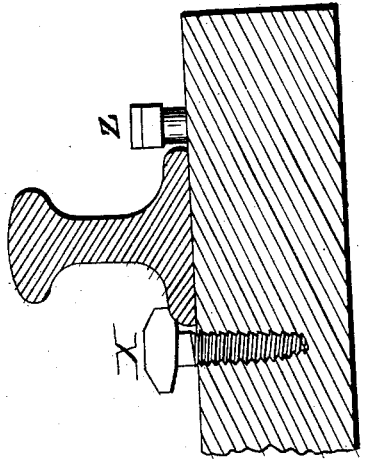
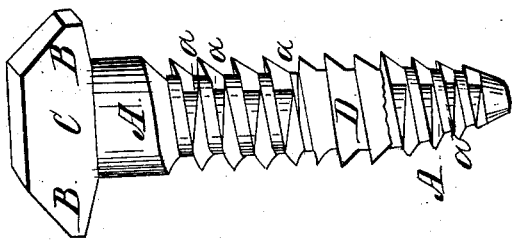
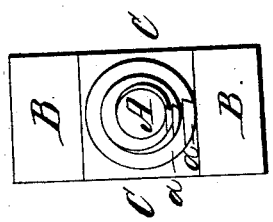
Witnesses:
Inventor:
John O Montignani

UNITED STATES PATENT OFFICE.

JOHN O. MONTIGNANI, OF ALBANY, NEW YORK.

IMPROVEMENT IN SECURING RAILWAY-BARS.

Specification forming part of Letters Patent No. 41,633, dated February 16, 1864.

*To all whom it may concern:*

Be it known that I, JOHN O. MONTIGNANI, of the city of Albany, State of New York, have invented a new and useful improvement for securing railway-bars to their wooden substructures and for analogous purposes, as a substitute for the hook-headed spike; and I declare the following specification, with the drawings forming part thereof, to be a full and complete description of my invention.

The fastenings now universally employed to secure the I-rail to the cross-ties or other timber foundation is the hook-headed spike, and, although the best mode now used for its purposes, is subject to the following defects: First, when driven into the tie it invariably splits the wood in its wake, (more or less,) leaving a fissure, into which water penetrates, producing early decay around the iron, so that the vibration of the rail soon draws the spikes, as may be readily seen by observing on railroads the large proportion of loosened spikes compared with the firm ones. Second, when the spikes become loosened from the above cause or from the compression of the rail into the tie by the pressure of the rolling-stock, the driving of the spike further carries it down too small a space to produce effective hold, while it loosens the adhesion of the spikes for the whole surface of its bed, so that the only way to insure security is to draw the spike and drive it down in a new place, which leaves the old bed open to water and consequent decay. Third, when it becomes necessary to take up a rail its spikes must all be drawn, and on replacing a rail driven into a new place. Fourth, if the hook be broken, then the spike is useless and must be replaced by another. Fifth, at best smooth spikes give a doubtful hold, and for that reason bearded spikes have been substituted for them, but discarded because they could not be withdrawn without great difficulty and by lacerating extensively and injuriously the fibers of the tie.

The object of my invention is to introduce a fastening free from the above objections, and furnishing a better security than either the plain or bearded spike. For this purpose I use a double-hooked wired screw, (shown in Figure 1,) being an iron screw, A, having a strong square head, C, prolonged into hooks B B, the under side of each of said hooks being beveled in such manner as to allow it to turn over and fit snugly upon the upper surface of the flange of the rail In Fig. 1 a portion of the screw is shown at D as cut down to the plane of its axis, to exhibit a peculiar form of the thread which I have used with experimental screws; but I do not propose to limit myself to any form of thread.

Fig. 3 shows the application of the screw to a rail—X the screw holding the rail, Z the screw turned to permit the removal of the rail.

The advantages of the screw I now state by contrasting it with the defects of the hook-headed spike, described in the first parts of this specification: First, the screw does not split the rail, leaving no place for the access of moisture. Second, when the rail settles down from the hook of the screw from any cause the evil can be remedied by a half or whole turn of the screw, which, instead of loosening its hold, increases it by adding more thread resistance and maintaining all it had. Third, in removing and replacing a rail it will be only necessary to give the screw a quarter turn, so as to clear the hook from the rail, when it can be removed, and when a new rail is placed to turn it back upon the rail. Fourth, if one hook be broken, another is left, and the screw is still serviceable. Fifth, the screw has greater hold than the bearded spike, yet can be drawn without injury to the tie.

What I claim as my invention, and desire to secure by Letters Patent, is—

The combination of a double-hooked head with a wood-screw, as described, for the purpose of securing railway-bars to their wooden substructures or any analogous use.

JOHN O. MONTIGNANI.

Witnesses:
RICH. VARICK DE WITT,
A. V. DE WITT.